United States Patent
Sorokina

(10) Patent No.: US 10,333,266 B2
(45) Date of Patent: Jun. 25, 2019

(54) GRAPHENE-BASED OPTICAL SUB-SYSTEM

(71) Applicant: ATLA LASERS AS, Trondheim (NO)

(72) Inventor: Irina T. Sorokina, Vikhammer (NO)

(73) Assignee: ALTA LASERS AS, Trondheim (NO)

( * ) Notice: Subject to any disclaimer, the term of this patent is extended or adjusted under 35 U.S.C. 154(b) by 0 days.

(21) Appl. No.: 15/031,872

(22) PCT Filed: Oct. 27, 2014

(86) PCT No.: PCT/EP2014/073027
§ 371 (c)(1),
(2) Date: Apr. 25, 2016

(87) PCT Pub. No.: WO2015/059310
PCT Pub. Date: Apr. 30, 2015

(65) Prior Publication Data
US 2016/0268760 A1    Sep. 15, 2016

Related U.S. Application Data

(60) Provisional application No. 61/895,821, filed on Oct. 25, 2013.

(51) Int. Cl.
| | |
|---|---|
| H01S 3/11 | (2006.01) |
| H01S 3/081 | (2006.01) |
| H01S 3/105 | (2006.01) |
| H01S 3/16 | (2006.01) |
| H01S 3/086 | (2006.01) |

(52) U.S. Cl.
CPC .......... *H01S 3/0815* (2013.01); *H01S 3/0811* (2013.01); *H01S 3/0817* (2013.01); *H01S 3/105* (2013.01); *H01S 3/1115* (2013.01); *H01S 3/1118* (2013.01); *H01S 3/1623* (2013.01); *H01S 3/1628* (2013.01); *H01S 3/086* (2013.01)

(58) Field of Classification Search
CPC ............................ H01S 3/1115; H01S 3/1118
See application file for complete search history.

(56) References Cited

U.S. PATENT DOCUMENTS

| | | | | |
|---|---|---|---|---|
| 5,235,605 | A * | 8/1993 | Rines | ........................ H01S 3/07 372/100 |
| 5,764,662 | A * | 6/1998 | Pinto | ..................... G02F 1/3534 372/20 |

(Continued)

FOREIGN PATENT DOCUMENTS

EP    1143581 A2    10/2001

OTHER PUBLICATIONS

Cizmeciyan, M N, et al.: "Graphene mode-locked femtosecond Cr:ZnSe laser at 2500 nm", Optics Letters, Optical Society of America, vol. 38, No. 3, Feb. 1, 2013, pp. 341-343, US.

(Continued)

*Primary Examiner* — Tod T Van Roy
(74) *Attorney, Agent, or Firm* — Eversheds Sutherland (US) LLP

(57) ABSTRACT

The present disclosure provides an optical sub-system for a passive, mode-locked laser optical system. The optical sub-system may include a graphene-based saturable absorber and an optical device configured to control dispersion properties of the laser optical system. The graphene-based saturable absorber may be supported by the optical device.

11 Claims, 2 Drawing Sheets

(56) References Cited

U.S. PATENT DOCUMENTS

| | | | |
|---|---|---|---|
| 6,614,828 B1* | 9/2003 | Basting | H01S 3/08004 372/100 |
| 2006/0198399 A1* | 9/2006 | Jablonski | B82Y 10/00 372/10 |
| 2012/0147908 A1* | 6/2012 | Simanovski | H01S 3/067 372/6 |
| 2013/0038924 A1* | 2/2013 | Fukazawa | H01S 3/1118 359/339 |

OTHER PUBLICATIONS

Xiaoying, He, et al.: "Wavelength-tunable, passively mode-locked fiber laser based on graphene and chirped fiber Bragg grating", Optics Letters, Optical Society of America, vol. 37, No. 12, Jun. 15, 2012, pp. 2394-2396, US.

Kopf, D, et al.: "All-in-one dispersion-compensating saturable absorber mirror for compact femtosecond laser sources", Optics Letters, Optical Society of America, vol. 21, No. 7, Apr. 1, 1996, pp. 486-488, US.

Alexander A. Lagatsky, et al.: "Fundamentally mode-locked, femtosecond waveguide oscillators multi-gigahertz repetition frequencies up to 15 GHz", Optica Express, vol. 21, No. 17, Aug. 13, 2013, pp. 19608-19614, US.

Ma J, et al.: "Graphene mode-locked femtosecond laser at 2 um wavelength", Optics Letters, Optical Society of America, vol. 37, No. 11, Jun. 1, 2012, pp. 2085-2087, US.

Baylam I, et al.: "Femtosecond pulse generation with voltage-controlled graphene saturable absorber", Optics Letters, Optical Society of America, vol. 39, No. 17, Sep. 1, 2014, pp. 5180-5183, US.

Evgeni Sorokin et al.: "Femtosecond SESAM-modelocked Cr:ZnS laser", Optics Express, vol. 20, No. 27, Dec. 17, 2012, pp. 28947-28952, US.

Tolstik, N, et al., "Graphene Mode-locked Cr:Zns Laser with 44 fs Pulse Duration", Advanced Solid-State Lasers Congress Technical Digest, OSA Technical Digest (online), Oct. 27, 2013, paper MWiC.I.

* cited by examiner

GRAPHENE-BASED OPTICAL SUB-SYSTEM

TECHNICAL FIELD

The present invention relates to a dual-function optical element for a passive mode-locked ultrashort-pulse laser system. Ultrashort-pulsed laser systems have many industrial and scientific applications, such as fine material processing, oil and gas sensing, synchronous pumping of an optical parametric oscillator, seed sources for high power optical amplifiers and for frequency combs, environment monitoring, and medicine.

BACKGROUND OF THE INVENTION

The nonlinear-optical properties of graphene-based materials, i.e. low saturation intensity, short lifetime, and broadband absorption across the spectrum are favourable for their use to initiate and support passive mode-locking in different lasers across the optical spectrum and in various forms and types. A recent review is given in Z. Sun, T. Hasan, A. C. Ferrari, "Ultrafast lasers mode-locked by nanotubes and graphene," Physica E: Low-dimensional Systems and Nanostructures 44, 1082-1091 (2012).

Another important feature of graphene-based materials is their compatibility with most optical materials, allowing their deposition on dielectric, semiconductor, and metal surfaces, including mirrors, transmitting optical elements, and fiber core-ends and side surfaces (as disclosed for example in U.S. Pat. Nos. 8,139,617 and 8,384,991).

For cost-effective production of ultrashort-pulse laser systems on an industrial scale, it is desirable to minimise the number of manually adjustable elements, providing the final assembling line with as few devices as possible. It is also desirable to provide a monolithic optical device, allowing for reliable long-term field operation.

SUMMARY OF THE INVENTION

Therefore, according to the present invention, there is provided an optical sub-system for a passive, mode-locked laser optical system, the optical sub-system comprising: a graphene-based saturable absorber; and an optical device configured to control dispersion properties of the laser optical system, wherein the graphene-based saturable absorber is supported by the optical device.

Provision of the optical element enables the generation of good quality short optical pulses or high-energy chirped optical pulses. Control of dispersion means compensating for, or correcting for, dispersion.

The present invention may further relate to a graphene-based device for an ultrashort-pulsed solid-state laser system for generation of self-starting ultra-short pulses, the graphene-based device acting simultaneously as an all-in-one saturable absorber mirror with a dispersion compensation function. Advantageously, the invention facilitates industrial-friendly approaches to optical device manufacturing.

The invention, along with the preferred features thereof, as discussed below, can be used in a wide variety of optically pumped semiconductor lasers, including but not limited to: semiconductor and solid-state thin disk lasers; vertical external-cavity surface-emitting lasers; other external cavity hybrid mode-locked diode lasers, as well as mode-locked wave-guide and fiber lasers.

Advantageously, the claimed optical sub-system (which acts simultaneously as an all-in-one saturable absorber mirror with a dispersion compensation function) allows for more compact laser systems (or even monolithic systems) to be provided.

The graphene-based saturable absorber can be in the form of a single or multiple layer of graphene deposited on a conventional plane multilayer mirror, or may take any other forms, including being distributed in a wave-guide or fiber.

Additionally or alternatively, the graphene-based saturable absorber may be voltage controlled. For example, the graphene-based saturable absorber may comprise a graphene-based capacitor or a graphene-based supercapacitor, and a voltage bias may be applied to the capacitor or supercapacitor in order to vary the operating conditions. Graphene-based capacitors and supercapacitors are therefore examples of voltage-controlled graphene-based saturable absorbers.

The graphene-based saturable absorber can produce self-starting short pulses ranging from picosecond to femtosecond pulse durations to be used in mass-producible pulsed laser sources with high output power and controllable pulse duration and spectral form.

Herein, "graphene-based" may mean comprising graphene, graphene oxide, graphene derivatives, functionalized graphene or carbon nanotubes (CNT).

The graphene-based saturable absorber (which may be voltage-controlled) may be deposited on a surface of the optical device. This means that the optical sub-system is physically implemented as a monolithic integrated device. In this case, the key laser emission parameters (for example, output wavelength and other pulse characteristics) are predefined to a fixed set of values.

The compatibility of graphene, graphene oxide, graphene derivatives, functionalized graphene and CNT materials with most optical materials allows the saturable absorber to be deposited on the surface of the optical material as an integral part of a manufacturing process, resulting in a combined device with more than one function. The deposition process is readily combinable with large-scale production approaches such as mirror coating and other device coating processes.

The graphene-based saturable absorber may be held spatially separated from the optical device by a supporting mechanism which is connected to the optical device. In some embodiments, the graphene-based saturable absorber may be deposited on a mirror. The mirror substrate may also act as a heat-sink. This is especially important for high-powered laser systems.

In a preferred embodiment, the supporting mechanism may be adjustable such that the distance between the graphene-based saturable absorber and the optical device is variable. Advantageously, this allows for tuning of the laser parameters (for example, output wavelength and other pulse characteristics).

Further advantageous benefits are obtained if the optical device is mounted on a mount allowing rotation of the optical device about an axis. This allows the angle of incidence onto the optical device to be changed, thereby allowing additional tuning of laser parameters, such as wavelength of the light pulse.

The optical device may be implemented in any number of physical forms, including mirrors with specially designed dielectric coatings providing the desired degree of dispersion.

Preferably, the optical materials used for the dielectric coatings with the deposited graphene saturable absorber should possess high thermal conductivity, such as for example, $Al_2O_3$ and $MgF_2$ for low-index layers, and SiC, Si, ZnS, ZnSe for high-index layers.

When the graphene-based saturable absorber is provided as a graphene-based capacitor or a graphene-based supercapacitor, the optical device may comprise the substrate material on which the graphene-based capacitor or supercapacitor is provided. That is, the capacitor or supercapacitor is provided by depositing graphene electrodes onto two opposed substrate layers. The optical properties of the substrate layers are chosen to provide the desired degree of material dispersion in order to control the dispersion properties of the laser optical system. Thus, the substrate layers on which the graphene-based capacitor or supercapacitor is provided are an example of the optical device.

Alternatively, the optical device may be a partially transparent output coupling mirror for forming a laser resonator, the output coupling mirror having a partial dispersion compensation function.

The optical substrate output coupler mirror with deposited graphene saturable absorber may be made from a material with high thermal conductivity, and preferably a low thermo-optical coefficient, and transparent for the laser radiation, such as for example dielectric or semiconductor crystals (e.g. corundum, ZnS, ZnSe, YAG, Si, SiC, GaAs etc. depending on the laser wavelength).

However, even when the output coupling mirror does not provide any dispersion compensation function, the combination of a graphene-based saturable absorber and output coupling mirror (either as a monolithic device or with adjustable distance between the components and/or adjustable angle of incidence) is considered to be inventive in its own right. Such a device may be provided on the active laser medium. This advantageously allows for provision of a compact monolithic laser system. Such a system may include any of the active laser gain media described below in relation to the preferred features of the present invention.

With regard to the present invention, the optical device may be a chirped mirror, a dispersion-controlling mirror, a focusing dispersion-controlling mirror, a pair of Gires-Tournois mirrors (a Gires-Tournois interferometer (GTI)).

The optical device may also be a dispersion controlling bulk element comprising a plate of sapphire, yttrium aluminum garnet, calcium fluoride, barium fluoride or other material transparent in the wavelength of interest. Preferably the plate thickness is between about 0.1 to 10 mm.

The optical device may also be any one of the following: multilayer dispersive mirrors; appropriately matched plane-parallel plates; thin wedges and/or prisms; and even optical fiber sections with built-in dispersion-controlling elements that include chirped distributed fiber Bragg gratings (optically equivalent to chirped mirrors).

The optical system may also include a laser gain medium doped with a transition metal ion dopant. The laser gain medium is preferably a single crystal or is polycrystalline.

In some embodiments, the transition metal ion dopant is selected from the group consisting of Ti, V, Cr, Mn, Fe, Co, Ni, and Cu, and in particular, the transition metal ion dopant may be $Cr^{2+}$ or $Fe^{2+}$.

The laser gain medium may comprise a host material selected from the group consisting of: sulfides, selenides, mixed selenide-sulfides, tellurides and corundum, and in particular, the host material may be selected from ZnS, ZnSe, ZnTe, CdS, CdSe and CdTe.

In preferred embodiments, the laser gain medium may be a chromium doped zinc sulfide (Cr:ZnS) crystal, or a chromium doped zinc selenide (Cr:ZnSe) crystal.

The laser gain medium may be a group II-VI compound having the formula MX, where M is a divalent cation selected from the group consisting of Mg, Zn, and Cd, or a combination of these, and X is a divalent anion selected from the group consisting of S, Se and Te, or a combination of these.

In other embodiments, the laser gain medium may be Ti:sapphire.

The laser crystal may be crystallographically orientated in a specific way, in order to suppress or increase the second order harmonic component of the laser radiation.

When the crystal has a cubic structure, it is preferably crystallographically orientated in such a way that the propagation vector of the light pulse is predominantly directed along one of the [100], [010], or [001] crystallographic axes of the crystal. This reduces the second order harmonic component of the laser radiation.

When the crystal has a wurtzite structure, it is preferably crystallographically orientated in such a way that the propagation vector of the light pulse is predominantly directed along the optical axis of the crystal, the optical axis being the [0001] crystallographic axis. This reduces the second order harmonic component of the laser radiation.

A passive mode-locked laser resonator comprising the optical system described above may also include a set of mirrors forming a cavity, the laser gain medium being provided within the cavity; a plurality of dispersive elements; and an optical Kerr element, wherein the optical Kerr element is the laser gain medium, or is provided as a separate element. Preferably, an angle of incidence of an intra-cavity signal laser beam on the optical device is adjustable.

Thus, the graphene-based mirror and optical device may be physically implemented as separate components that are mechanically grouped together with adjustable relative position (relative separation and angle of incidence of the intra-cavity signal laser beam) thus allowing the variation of key laser emission parameters that include the output wavelength and other pulse characteristics, or may be physically implemented as a monolithic integrated device that predefines the key laser emission parameters to a fixed set of values.

For example, in cubic symmetry single crystalline Cr:ZnS or Cr:ZnSe, the propagation vector of the signal laser beam is preferably parallel to one of the crystallographic axes [100], [010], or [001]. The propagation vector of the signal laser beam in the corresponding wurzite-structured crystals is preferably parallel to the crystallographic axis [001].

This can also be applied to polycrystalline materials as the laser medium, with composition as mentioned above, as well as such crystals as Ti:Saphire, Cr:YAG, Cr:Forsterite, Yb:YAG or other broadband emission laser materials.

The described system allows generation of laser pulses with temporal width of less than 1 ns (i.e. ultrashort-pulses) and more preferably between just a few femtoseconds and several hundred picoseconds in the wavelength range extending from 0.35 µm to 10 µm, depending on the specific embodiment of the invention.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

A preferred embodiment of the present invention will now be described in greater detail by way of example only and with reference to the accompanying figures in which.

DETAILED DESCRIPTION

Figure 1:
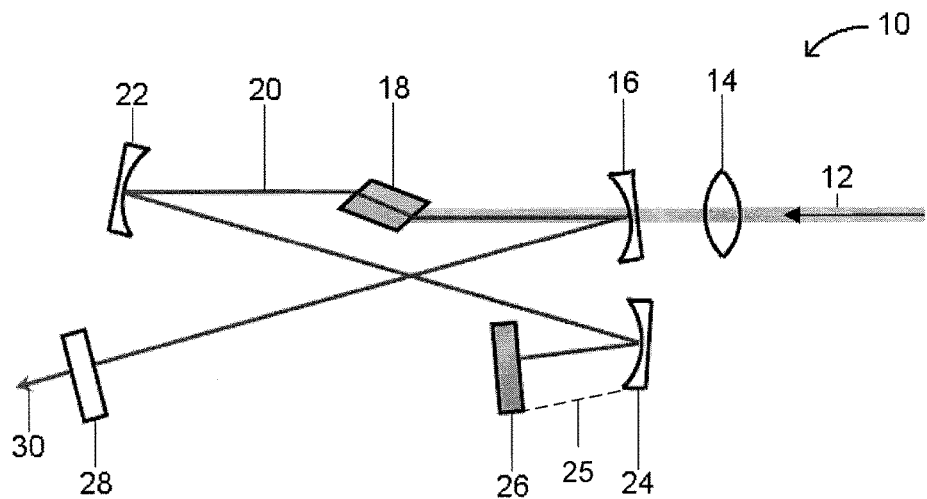
FIG. 1 shows a Cr:ZnS femtosecond laser with a dispersion-compensating graphene-based self-starting optical subsystem.

The laser system 10 shown in FIG. 1 generates laser pulses of a few tens of femtoseconds at a wavelength near 2.4 μm.

A CW Er-fiber laser was used as a pump source 12. The laser provided up to 5 W of polarized pump emission at 1.61 μm.

The system 10 comprises a common X-folded astigmatically compensated four-mirror cavity, having a total length of about 2.9 m and equivalent arm length ratio of 3:2. A 2.5 mm thick passively-cooled Cr:ZnS active element 18 is positioned at Brewster angle between the concave cavity mirrors 16 and 22 having radius of curvature (ROC) of 50 and 75 mm, respectively.

The cavity mode is focused to a graphene saturable absorber 26 by a chirped concave mirror 24 with ROC=150 mm. The graphene saturable absorber 26 is deposited directly on the surface of the flat high-reflector mirror (by chemical vapor deposition on a copper substrate) thus forming the graphene-based saturable absorber mirror. The graphene saturable absorber 26 is mounted on a supporting element 25 which is connected to the chirped mirror 24.

Compensation of the group-delay dispersion was achieved by a double reflection (on a round trip) from a chirped high reflectance concave mirror 24.

The laser output 30 was coupled out of the system by output coupler 28.

Figure 2:
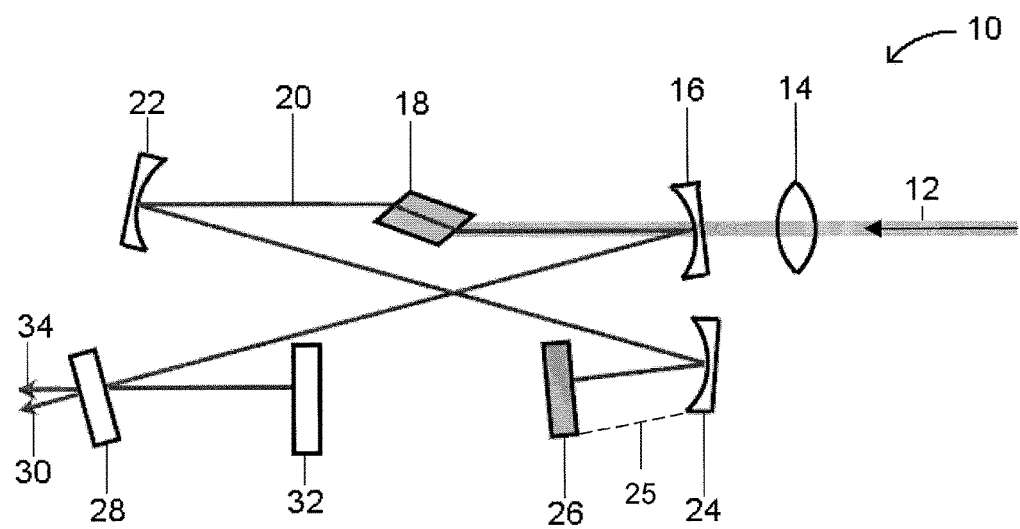
FIG. 2 shows a modified version of the system of FIG. 1.

FIG. 2 is similar to FIG. 1, except that the compensation of the group-delay dispersion is achieved by one single reflection from a chirped high reflectance mirror 32. The output coupler 28 is set in a folding position in order to ensure only one reflection from the chirped mirror 32. The laser thus emitted two beams 30, 34 and the measured output power is a sum of both beams.

Figure 3:
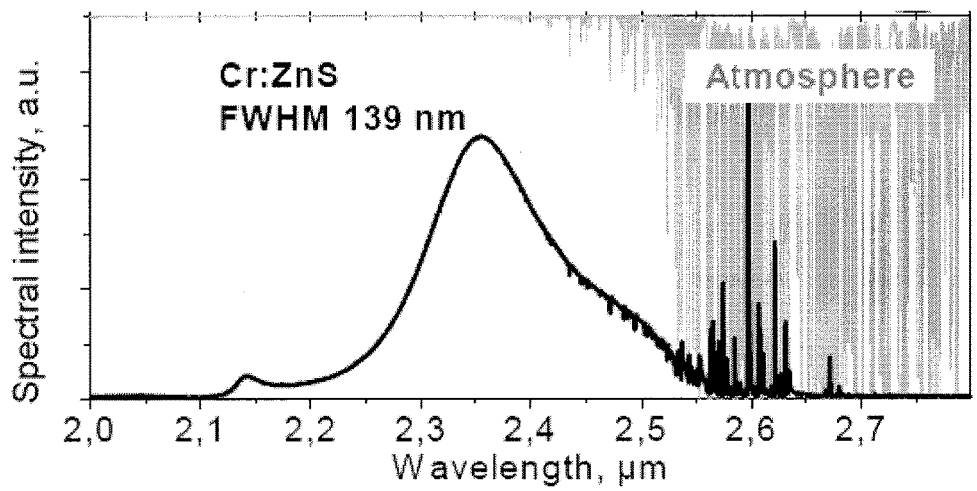
FIG. 3 shows an optical spectrum of the output of the system.

FIG. 3 shows the optical spectrum of the output of the system.

Figure 4:
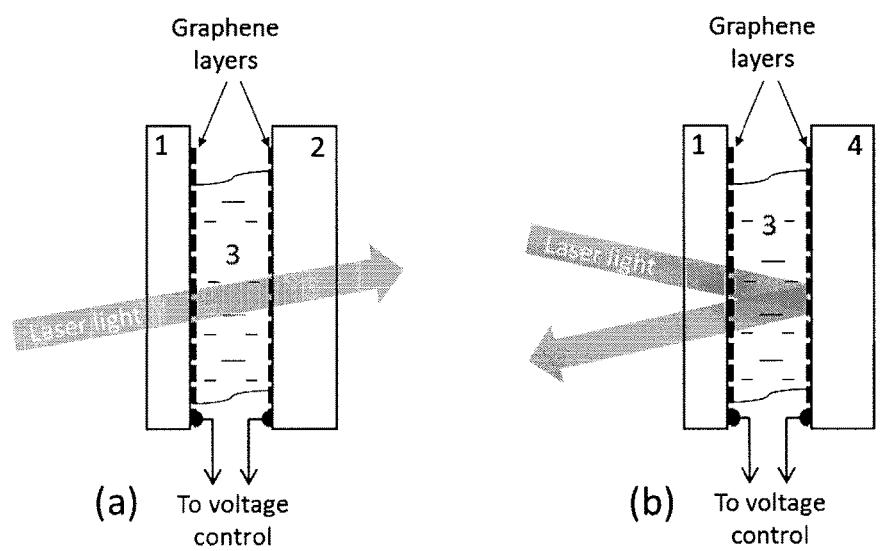
FIG. 4 shows an optical sub-system comprising a graphene-based capacitor or supercapacitor acting as voltage-controlled saturable absorber, deposited on an optical device with dispersion control capability, wherein the optical sub system is transmissive (FIG. 4(*a*)) or reflective (FIG. 4(*b*)).

FIG. 4 shows an optical sub-system comprising a graphene-based capacitor or supercapacitor acting as voltage-controlled saturable absorber, deposited on an optical device with dispersion control capability.

As shown in FIG. 4(*a*), the capacitor or supercapacitor comprises two polished bulk substrate plates 1, 2 which can be made from, for example, YAG, Sapphire, $BaF_2$, or $CaF_2$, which are transparent at the laser operation wavelength and which have a thickness of typically one to a few millimeters (or any length necessary to provide dispersion management inside the laser resonator). The substrate plates introduce a desired amount of dispersion at the laser operation wavelength.

Alternatively, as shown in FIG. 4(*b*), one of the graphene electrodes can be transfer printed onto a dielectric mirror (4), dispersion compensation mirror, or output coupler mirror, which will act as one of the substrates.

On the substrate plates are provided voltage controlled graphene electrodes. Such electrodes can have a form of two monolayer large-area graphene electrodes, each synthesized via chemical vapor deposition and transfer printed onto the above substrate plate.

The spacing 3 between the two graphene electrodes can be filled, for example, with an electrolyte (supercapacitor) or a dielectric (capacitor).

The following clauses set out features of the invention which may not presently be claimed in this application, but which may form the basis for future amendment or a divisional application.

1. An optical system comprising:
    a passively mode-locked short pulse laser resonator comprising of the cavity forming set of mirrors and dispersive elements, supplied with an excitation pump beam and causing a resonator laser beam, a transition-metal doped laser crystal including an optical Kerr element, and the graphene based device, which acts simultaneously as a saturable absorber mirror with dispersion compensation function to achieve self-starting mode locking and to control the pulse temporal, spectral, and phase properties, wherein:
    said transition metal ion dopant acts as an active laser light emitting optical center;
    excitation pump beam means associated with the gain medium for pumping the gain medium;
    cavity forming means surrounding the gain medium to form a resonant laser cavity;
    including an optical Kerr element means either associated with the Kerr-Lens producing effect inside the laser crystal or a separate from the laser crystal optical Kerr element inside the laser resonator;
    graphene based means comprising at least one of graphene, a graphene derivative, carbon nanotubes and functionalized graphene;
    self-starting means that short pulses start to form without external force at the moment of switching on the pump beam;
    a multilayer dispersive mirror means a dielectric or semiconductor based highly or partially reflective multilayer Bragg-reflector mirror of the type of "Gires-Tournois" or "chirped mirror".

2. An optical system according to clause 1, wherein said laser crystal is a chromium doped zinc sulfide (Cr:ZnS) crystal;

3. An optical system according to clause 1, wherein said laser crystal is a chromium doped zinc selenide (Cr:ZnSe) crystal;

4. An optical system according to clause 1, wherein said laser crystal is selected from the group consisting of sulfide, selenide, mixed selenide-sulfide, telluride and corundum host materials.

5. An optical system according to clause 4 wherein the transition metal ion dopant is selected from the group consisting of Ti, V, Cr, Mn, Fe, Co, Ni, and Cu.

6. An optical system according to clause 5, wherein said laser crystal is a II-VI compound having the formula MX, where M is a divalent cation selected from the group consisting of Mg, Zn, and Cd, or a combination of these and X is a divalent anion selected from the group consisting of S, Se and Te, or a combination of these.

7. An optical system according to clause 6, wherein said host material is selected from ZnS, ZnSe, ZnTe, CdS, CdSe and CdTe.

8. An optical system according to clause 8 wherein the transition metal ion is selected from the group consisting of $Cr^{2+}$ and $Fe^{2+}$.

9. An optical system according to clause 5, wherein said laser crystal is a Ti:sapphire.

10. An optical system according to any preceding clause, wherein said gain medium is a polycrystalline material.

11. An optical system according to any of clauses 1 to 10, wherein said gain medium is a single-crystalline material.

12. An optical system according to clause 1, wherein the distance between the graphene based mirror and dispersive mirror of said device is adjustable.

13. An optical system according to clause 1, wherein the angle of incidence of the intra-cavity signal laser beam on the dispersive mirror of the said device is adjustable.

14. An optical system according to clause 1, wherein the laser resonator forming output coupling mirror is graphene based with both saturable and partial dispersion compensation function.

15. An optical system according to clause 1, wherein the said graphene based device is comprised of the graphene based saturable absorber mirror consisting of a single or more graphene or graphene based layers is supported on the facet of a dispersion-controlling mirror.

16. An optical system according to clause 1, wherein the said graphene based device is comprised of the graphene based saturable absorber mirror consisting of a single or more graphene or graphene based layers is supported on the facet of the output dispersion-controlling mirror.

17. An optical system according to clause 1, wherein the said dispersive elements may also include a plate (of tenths to few millimeters thick) of sapphire, yttrium aluminum garnet, calcium fluoride, barium fluoride or other material transparent in the wavelength of interest and providing substantial dispersion-compensating function in the cavity.

18. An optical system according to clause 1, wherein the said dispersive element is comprised of a graphene based saturable absorber mirror with a focusing dispersion-controlling mirror, such device being preferably manufactured and aligned as a single unit prior to final assembly.

19. An optical system according to clause 1, wherein the said dispersive element is comprised of a graphene based saturable absorber mirror with a pair of Gires-Tournois mirrors with adjustable angle of incidence to achieve desired operation wavelength and dispersion, such device being preferably manufactured and aligned as a single unit prior to final assembly.

20. An optical system according to clause 2, wherein the said laser crystal is crystallographically orientated in such a way that the propagation vector of the light pulse is directed along one of the crystallographic axes of the crystal [100], [010], or [001].

21. An optical system according to clause 3, wherein the said laser crystal is crystallographically orientated in such a way that the propagation vector of the light pulse is directed along one of the crystallographic axes of the crystal [100], [010], or [001].

22. An optical system according to clause 1, wherein said laser crystal is a chromium doped zinc sulfide (Cr:ZnS) crystal of the wurtzite structure;

23. An optical system according to clause 22, wherein the said laser crystal is crystallographically orientated in such a way that the propagation vector of the light pulse is directed along the optical axis of the crystal (crystallographic axis [001]).

24. An optical system according to clause 5, wherein the said cubic laser crystal is crystallographically orientated in such a way that the propagation vector of the light pulse is directed along one of the crystallographic axes of the crystal [100], [010], or [001].

25. An optical system according to clause 5, wherein the said wurtzite laser crystal is crystallographically orientated in such a way that the propagation vector of the light pulse is directed along the optical axis of the crystal (crystallographic axis [001]).

26. An optical system according to clause 6, wherein the said cubic laser crystal is crystallographically orientated in such a way that the propagation vector of the light pulse is directed along one of the crystallographic axes of the crystal [100], [010], or [001].

27. An optical system according to clause 6, wherein the said wurtzite laser crystal is crystallographically orientated in such a way that the propagation vector of the light pulse is directed along the optical axis of the crystal (crystallographic axis [001]).

28. An optical sub-system for a passive, mode-locked laser optical system, the optical sub-system comprising;
    a graphene-based saturable absorber; and
    a partially transparent output coupling mirror;
    wherein the graphene-based saturable absorber is supported by the output coupling mirror.

29. An optical sub-system according to clause 28, wherein the graphene-based saturable absorber is deposited on a surface of the output coupling mirror.

30. An optical sub-system according to clause 28, wherein the graphene-based saturable absorber is held spatially separated from the output coupling mirror by a supporting mechanism which is connected to the output coupling mirror.

31. An optical sub-system according to clause 28, wherein the graphene-based saturable absorber is deposited on a mirror.

32. An optical sub-system according to clause 30 or 31, wherein the supporting mechanism is adjustable such that the distance between the graphene-based saturable absorber and the output coupling mirror is variable.

33. An optical sub-system according to any of clauses 28 to 32, wherein the output coupling mirror is mounted on a mount allowing rotation of the output coupling mirror about an axis.

34. An optical sub-system according to any of clauses 28 to 33, wherein the graphene-based saturable absorber comprises at least one of: graphene, a graphene derivative, carbon nanotubes and functionalized graphene.

35. An optical sub-system according to any of clauses 28 to 34, further comprising an active gain medium, wherein the optical sub-system is provided integrally with or connected to and the active laser gain medium.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

I claim:

1. An optical sub-system for a passive, mode-locked laser optical system, the optical sub-system providing an all-in-one saturable absorber mirror with a dispersion compensation function, the optical sub-system comprising:
    a graphene-based saturable absorber; and
    an optical device comprising a multilayer dispersive mirror configured to control dispersion properties of the laser optical system, wherein the graphene-based saturable absorber is deposited on a surface of the optical device, and
wherein the optical device is mounted on a mount allowing rotation of the optical device about an axis to change an angle of incidence onto the optical device and allow additional tuning of laser parameters including a wavelength of a light pulse.

2. An optical sub-system according to claim 1, wherein the graphene-based saturable absorber comprises at least one of: graphene, a graphene derivative, carbon nanotubes and functionalized graphene,
and/or wherein the graphene-based saturable absorber is configured to be voltage controlled, wherein the graphene-based saturable absorber is a graphene-based capacitor or supercapacitor.

3. An optical system, comprising:
an optical sub-system providing an all-in-one saturable absorber mirror with a dispersion compensation function for a passive, mode-locked laser optical system, the optical sub-system comprising:
a graphene-based saturable absorber; and
an optical device comprising a multilayer dispersive mirror, the optical device configured to control dispersion properties of the laser optical system,
wherein the graphene-based saturable absorber is deposited on a surface of the optical device, and
wherein the optical device is mounted on a mount allowing rotation of the optical device about an axis to change an angle of incidence onto the optical device and allow additional tuning of laser parameters including a wavelength of a light pulse; and
the optical system further comprising:
a laser gain medium doped with a transition metal ion dopant.

4. An optical system according to claim 3, wherein the laser gain medium is a single crystal or wherein the laser gain medium is polycrystalline.

5. An optical system according to claim 4, wherein when the crystal has a cubic structure, it is crystallographically orientated in such a way that the propagation vector of the light pulse is predominantly directed along one of the [100], [010], or crystallographic axes of the crystal or wherein when the crystal has a wurtzite structure, it is crystallographically orientated in such a way that the propagation vector of the light pulse is predominantly directed along the optical axis of the crystal, the optical axis being the [0001] crystallographic axis.

6. An optical system according to claim 3, wherein the transition metal ion dopant is selected from the group consisting of Ti, V, Cr, Mn, Fe, Co, Ni, and Cu or wherein the transition metal ion dopant is selected from the group consisting of Cr2+ and Fe2+.

7. An optical system according to claim 3, wherein said laser gain medium comprises a host material selected from the group consisting of: sulfide, selenide, mixed selenide-sulfide, telluride and corundum.

8. An optical system according to claim 3, wherein said host material is selected from ZnS, ZnSe, ZnTe, CdS, CdSe and CdTe.

9. An optical system according to claim 3, wherein said laser gain medium is a II-VI compound having the formula MX, where M is a divalent cation selected from the group consisting of Mg, Zn, and Cd, or a combination of these and X is a divalent anion selected from the group consisting of S, Se and Te, or a combination of these or wherein the laser gain medium is Ti:sapphire.

10. An optical system according to claim 3, wherein the laser gain medium is a chromium doped zinc sulfide (Cr:ZnS) crystal, or a chromium doped zinc selenide (Cr:ZnSe) crystal.

11. A passively mode-locked laser resonator, comprising:
an optical system comprising:
an optical sub-system providing an all-in-one saturable absorber mirror with a dispersion compensation function for a passive, mode-locked laser optical system, the optical sub-system comprising;
a graphene-based saturable absorber; and
an optical device comprising a multilayer dispersive mirror, the optical device configured to control dispersion properties of the laser optical system,
wherein the graphene-based saturable absorber is deposited on a surface of the optical device, and
wherein the optical device is mounted on a mount allowing rotation of the optical device about an axis to change an angle of incidence onto the optical device and allow additional tuning of laser parameters including a wavelength of a light pulse; and
the optical system further comprising:
a laser gain medium doped with a transition metal ion dopant, and
the passively mode-locked laser resonator further comprising:
a set of mirrors forming a cavity, the laser gain medium being provided within the cavity;
a plurality of dispersive elements; and
an optical Kerr element,
wherein the optical Kerr element is the laser gain medium, or is provided as a separate element.

* * * * *